United States Patent

Quinn

[15] 3,667,022
[45] May 30, 1972

[54] CONTROL FOR SUMP PUMP

[72] Inventor: James L. Quinn, 6143 West Touhy Avenue, Chicago, Ill. 60648

[22] Filed: Sept. 2, 1970

[21] Appl. No.: 68,940

[52] U.S. Cl. ............................................. 318/482, 417/36
[51] Int. Cl. ....................................................... G05b 13/00
[58] Field of Search ................ 318/482, 642; 417/36, 44, 45; 137/392

[56] References Cited

UNITED STATES PATENTS

| | | | |
|---|---|---|---|
| 3,279,379 | 10/1966 | Klyce | 137/392 |
| 3,408,941 | 11/1968 | Sorensen | 137/392 |
| 2,697,196 | 12/1954 | Harper | 318/482 |
| 3,485,262 | 12/1969 | Perren | 318/482 |
| 3,502,899 | 3/1970 | Jones | 417/45 |

Primary Examiner—Barnard A. Gilheany
Assistant Examiner—Thomas Langer
Attorney—Wolfe, Hubbard, Leydig, Voit & Osann, Ltd.

[57] ABSTRACT

A control for a motor driving a sump pump having lower and upper limit probes which includes first and second silicon controlled rectifiers having electrodes which are coupled to the respective probes. The anode-cathode circuit of the second silicon controlled rectifier includes a lamp having an associated photocell. The photocell is connected to the control electrode of a bilateral solid state switch, or triac, which is in series with the motor. The first silicon controlled rectifier is supplied with half-waves of a-c. so that it conducts when the lower limit probe is submerged, but is non-latching. Responsive to such conduction is a capacitor which applies direct voltage to the second silicon controlled rectifier so that the latter latches on when the upper probe becomes submerged. Thus when the water in the sump is pumped down, out of contact with the upper limit probe, the motor continues to be energized. However, when the water is pumped below the level of the lower limit probe, the first silicon controlled rectifier becomes non-conducting and the capacitor no longer applies direct voltage to the second silicon controlled rectifier so that the latter becomes unlatched, thereby turning off the motor. The silicon controlled rectifiers are supplied with current from an isolated secondary winding and the circuit is further isolated from the motor by lamp and photocell.

7 Claims, 4 Drawing Figures

Patented May 30, 1972

3,667,022

INVENTOR
JAMES L. QUINN by: Wolfe, Hubbard, Leydig, Voit & Osann
ATTYS.

CONTROL FOR SUMP PUMP

It is an object of the present invention to provide a novel solid state control for a sump pump or the like which has greater reliability than the usual control employing float-operated limit switches, or employing electro-mechanical relays, and in which reliability is not affected even when the system must stand dormant for extended periods. It is another object to provide a solid state control for a sump pump which draws practically no current as long as the water in the sump is at a low level, which employs only low values of control current when the probes are successively submerged and in which the probes operate free of electrolytic effects.

It is a related object of the invention to provide a solid state control circuit which is electrically isolated at both its input and at its output from the regular a-c. supply line with an independent ground circuit for providing a reference voltage level for the probes. It is more specifically an object of the invention to provide a solid state control circuit in which isolation is provided at the input by means of a transformer and in which isolation is provided at the output by means of a lamp-photocell stage, with the photocell serving to actuate the control electrode of a triac or similar bilateral solid state switch which is connected in series with the pump motor.

It is a general object of the present invention to provide a solid state control circuit, as above, which is economical, highly compact, and which is entirely self-contained, intended for mounting well above the water level to facilitate quick and easy installation and prompt substitution in the event any servicing becomes necessary.

Other objects and advantages of the invention will become apparent upon reading the attached detailed description and upon reference to the drawings in which.

While the invention has been described in connection with a preferred embodiment, it will be understood that I do not intend to be limited to the particular embodiment shown, but I intend, on the contrary, to cover the various alternative and equivalent constructions included within the spirit and scope of the appended claims.

Figure 1:
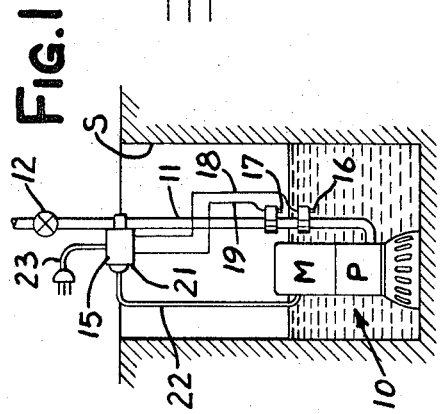
FIG. 1 is a cross-sectional diagram of a typical installation employing the present invention.
Figure 2:
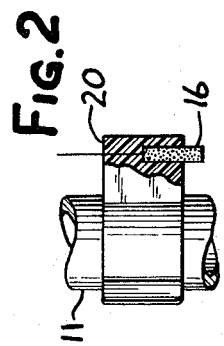
FIG. 2 is an enlarged elevational view of one of the probes.
Figure 3:
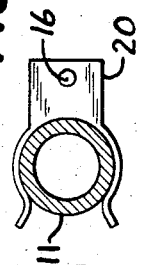
FIG. 3 is a bottom view of the probe shown in FIG. 2.

Turning now to FIG. 1 there is disclosed a typical installation including a sump pump assembly 10 made up of a motor M and centrifugal pump P mounted in a sump S and having a vertical discharge pipe 11 including the usual check valve 12. Secured to the pipe 11, or otherwise mounted well above the level of the water and separate from the motor and pump, is a control unit 15 having a lower limit probe 16 and an upper limit probe 17 connected to the control unit by insulated wires 18, 19 respectively. Each probe 16, 17 is preferably mounted on a friction-type clamp or slide 20 (see FIGS. 2 and 3), made of springy plastic or other insulating material permitting easy adjustment of the lower and upper probe positions. The electrode material is preferably carbon, a short length of carbon rod being imbedded in the plastic with only the lower tip exposed. It is one of the features of the construction that, except for the probes, the unit 15 is entirely self-contained, the housing 15 including a socket 21 for plugging in a cord 22 leading from the motor. The supply cord 23 may be plugged into any convenient a-c. outlet.

While the operating sequence will be discussed in greater detail it will suffice for the present to say that when the level of the water in the sump reaches the upper probe 17 the motor is actuated and remains energized until the water is pumped down to below the level of the lower probe 16, whereupon the motor is turned off. This insures that the water will not rise any higher than the upper probe, and the cycle time may be made either long or short by varying the amount by which the lower probe is spaced downwardly from the upper probe.

In accordance with the present invention, a first solid state switch is provided having a control element, or gate, connected to the lower probe and supplied with half-waves of current, so that the load current cyclically passes through zero, so as to be non-latching. At the output of the first solid state switch is a capacitor which is charged when the first switch is turned on and which serves to apply direct voltage to a second solid state switch, the gate of which is connected to the upper probe, the second solid state switch being latchable by reason of the direct voltage so that it remains turned on, for sustained operation of the motor, until the first solid state switch turns off. Further in accordance with the invention, both the input and output of the control circuit are isolated from the regular a-c. line, the control circuit being provided with its own ground connection which serves as a reference for the probes.

Figure 4:
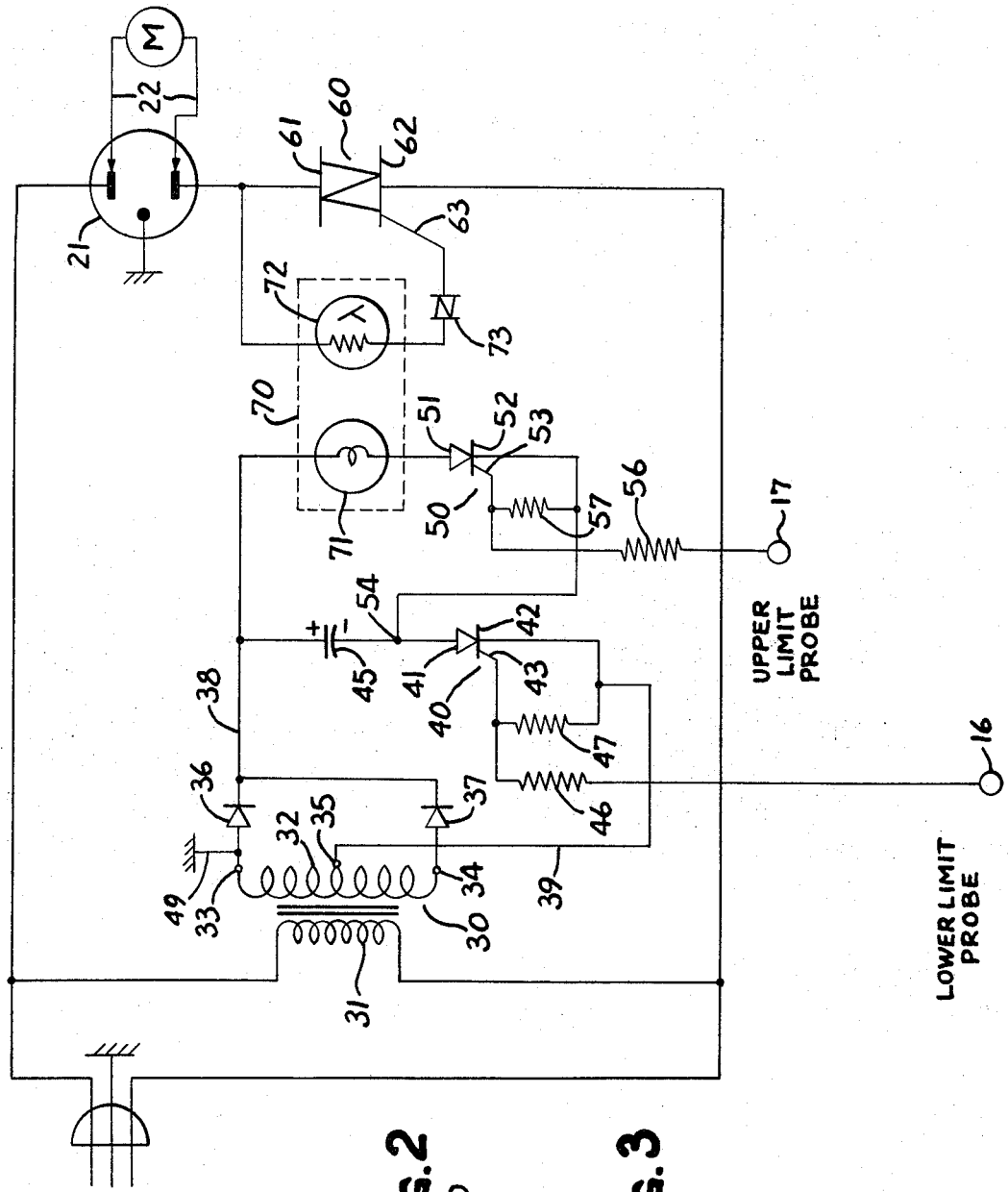
FIG. 4 is a schematic diagram of the control circuit.

Thus, referring to FIG. 4 of the drawings, a transformer 30 is provided having a primary winding 31 and a secondary winding 32, the latter having end terminals 33, 34 and a center tap 35. Forwardly facing diodes 36, 37 perform full wave rectification to apply successive half-waves of positive voltage to line 38, with return via line 39 connected to the center tap.

For the purpose of converting the rectified half-waves of voltage, which cyclically pass through zero, to a direct voltage which does not pass through zero, so as to provide latching in the next switching stage, a first solid state switch 40 is provided having an anode 41, a cathode 42 and a control electrode or gate 43, a capacitor 45 being connected to the anode. The control electrode 43 is coupled to the lower probe 16 via a resistor network, or divider, made up of a first resistor 46 which is connected to the probe and a second resistor 47 which is connected, along with the cathode 43, to the return line 39 leading to the transformer. The solid state switch 40 is preferably in the form of a silicon controlled rectifier. Such a device is generally considered to be latchable, that is, to have the ability of remaining turned on, with current flow in the anode-cathode circuit, once a pulse of positive triggering voltage has been applied to the gate electrode. However, in the present instance latching is defeated by the fact that the load circuit is supplied with half-waves of a-c. A ground connection 49 is made to the terminal 33 of the transformer for the purpose of providing a reference for the probe 16. Thus, in operation, when the probe 16 is contacted by the water in the sump, the probe is effectively connected to terminal 33 of the transformer where it is subjected to the positive pulses which are in phase with the pulses of voltage applied to the anode-cathode circuit, thereby making the switch conductive so that a charge, of the polarity shown, is built up upon the capacitor 45.

For the purpose of turning on the motor when the water level reaches the upper probe 17, and for latching in response to the direct voltage on capacitor 45, a second, or latchable, solid state switch in the form of a silicon controlled rectifier 50 is provided having an anode 51, a cathode 52 and a control element or gate 53. The cathode terminal 52 is preferably connected to a terminal 54 between the switch 40 and the capacitor 45 so as to be directly subject to the direct voltage on the capacitor and effectively in series with the switch 40. The gate electrode is connected to the midpoint of a network made up of a first resistor 56 which leads to the upper probe and a second resistor 57 which is connected to the cathode.

In order to couple the anode-cathode circuit of the switch 50 to the motor M a solid state relay is provided which is responsive to the load current of the switch but which nevertheless provides electrical isolation. Thus the motor is connected in the load circuit of a bilateral solid state switch, or triac, 60, having load terminals 61, 62 and a gate terminal 63. To energize the gate terminal 63, and to provide the desired isolation, a lamp-photocell stage 70 is provided in series with the output of the switch 50. The stage has a lamp 71 with a photocell 72 closely coupled thereto, the photocell being of the type which suffers a substantial reduction in resistance upon being light struck, thereby effectively connecting the gate terminal 63 to the upper terminal 61 of the triac to make the latter bi-directionally conductive. To insure that the turn-on voltage for the triac is at a reliably high level, in other words, to enable the triac to snap between its non- and conductive modes, a trigger diode 73 is interposed in series with the gate line 63.

While the operation of the overall circuit will be apparent to one skilled in the art, it will be helpful to review a complete operating cycle. It will be assumed first of all that the water level is initially below the lower limit probe 16 as a result of a dry spell. Under such circumstances the switches 40, 50 and 60 are all turned off and substantially no current is drawn from the supply line. When the water level in the sump rises, due to rain or to any other cause, the contact of the water with the lower limit probe 16 effectively connects the gate 43 to the transformer terminal 33, causing the switch 40 to conduct on a non-latching basis to charge the capacitor 45. This does not, however, result in turning on of the motor.

As the water continues to rise, reaching the level of the upper limit probe 17, the gate 53 is effectively connected to the transformer terminal 33. The first positive half-wave from the terminal 33 triggers the switch 50 for conduction, and conduction continues thereafter by reason of the fact that the charge on the capacitor 45 prevents the voltage applied to the switch 50 from going through the zero axis. Conduction turns on the lamp 71 which drops the resistance of the photocell 72. Any appreciable drop makes the trigger diode 73 conductive, thereby turning on the triac 60 so that current may flow to the motor from the supply line.

As the water level drops away from the upper limit probe the circuit to the gate 53 is broken but the switch 50 continues to conduct by reason of the direct voltage existing across the capacitor 45. However, as the water level drops still further, finally clearing the lower limit probe 16, the switch 40, which operates in a non-latching mode, is effectively turned off so that the capacitor 41 is no longer maintained in the charged condition. The charge accumulated in the capacitor is quickly drained off by the load circuit so that the voltage on the capacitor becomes zero and conduction through the switch 50 ceases, turning off the lamp 71. This causes the resistance of the photocell 72 to quickly rise to the point where the voltage across the trigger diode 73 is no longer adequate to produce current flow thereby making the triac 60 non-conductive, turning off the motor. The motor remains off until the water level again rises to produce successive contact with the probes 16, 17, and the cycle is repeated.

Typical parameters which may be employed in a practical circuit are as follows:

| | |
|---|---|
| transformer 30 | 18 volts r.m.s., center tapped |
| diodes 36, 37 | Type 1N 4001 |
| switch 40 | SCR GE & Type C103Y |
| capacitor 45 | 15 mfd. |
| resistor 46 | 18,000 ohms ½ w. |
| resistor 47 | 1,000 ohms ½ w. |
| switch 50 | SCR GE Type C103Y |
| resistor 56 | 18,000 ohms ½ w. |
| resistor 57 | 1,000 ohms ½ w. |
| triac 60 | GE Type SC 51B |
| lamp 71 | Sylvania Type 12ES |
| photocell 72 | VACTEC Type VT214 |
| trigger diode 73 | GE Type ST2 |

The resistors 46, 47 and 56, 57 may be adjusted relative to one another to provide the desired degree of sensitivity and so that the gate electrodes are not triggered by presence of foam on the water in the sump. Use of a triac type SC 51B permits a pump motor on the order of one-half horsepower to be employed. By using one of the transformer terminals as a reference ground connection, the voltage on the probes is purely alternating, thereby to minimize corrosion or plating effects and insuring a long probe life. It will be apparent, however, to one skilled in the art that the reference ground connection may, if desired, be made to the positive voltage line 38. This change would enable the switch 40 to conduct during successive half cycles rather than in alternate half cycles and would be feasible with some sacrifice in probe life or where probes of a noble metal such as platinum are used. For reasons of cost it is desirable to use carbon as a probe material.

It will also be apparent to one skilled in that art that while full wave rectification by diodes 36, 37 is preferred, one-half of the transformer secondary, and one diode, may, if desired, be dispensed with to obtain half-wave rectification. Indeed, because of the rectification which is inherent in the switches 40, 50 it is not essential to employ a rectifier in the voltage supply. Thus the term "half-waves of a-c." as used herein includes half-waves in a fully rectified series, in a half-wave rectified series, or in a non-rectified wave.

In the preferred form of circuit the switches 40, 50 are effectively connected in series with one another. This insures that when the water level drops below the lower limit probe the lamp 71 in the load circuit of switch 50 is "doubly" turned off, that is, turned off by lack of gate current and turned off by lack of current supply to the anode-cathode circuit. However, it will be understood that it is not essential to connect the switches 40, 50 in series and that the cathode return lead of the switch lead, may, if desired, be connected to the transformer return line 39 without departing from the invention.

The term "direct voltage", particularly referring to the voltage appearing across the capacitor 45, is intended to mean a voltage which does not drop to zero level but has a net value at all times, even though subject to considerable cyclical variation in level.

Since the probes, by reason of the ground connection 49, are supplied with substantially pure a-c., they are electrolytically neutral even in water having a high ion content. Both the "plating" which would tend to occur where the probes having net negative potential or the loss by corrosion which would tend to occur where the probes have a net positive potential are effectively defeated. Nor is it possible for the probes to be affected by leakage currents because of the high degree of electrical isolation provided in the transformer and lamp-photocell stage.

It is preferred to employ, in the position of the switch 40, a silicon controlled rectifier which is capable of latching and to operate the switch in a non-latching mode. However it will be apparent to one skilled in the art that non-latching type switches, such as a power transistor, may be substituted, if desired, without departing from the invention. Indeed, as far as the first switching stage is concerned, and in the broader aspects of the invention, any device may be employed which is of a non-latching nature and which is capable of producing a direct voltage at its output whenever the probe 16 is submerged for achieving a latched condition in the switch 50.

The present solid state control for sump motor overcomes many of the problems which have made conventional controls for a sump motor less than completely reliable. Thus the present system avoids the usual floats, mechanical linkages and switch contacts which, in this type of environment, tend to rust, corrode or malfunction, particularly after a period of inactivity. Electromechanical relays, with their susceptibility to dirt and corrosion have also been completely avoided. All control elements with the exception of the stationary probes 16, 17 may be sealed in a compact, self-contained enclosure and may, if desired, be potted in epoxy resin or the like. The device 15 may be readily detached and a replacement substituted within a few minutes time, or a new pump-motor assembly may be substituted, leaving the control unit in place. Moreover, by making the control system completely independent of the motor and pump, manufacture and installation of the latter is greatly simplified.

I claim as my invention:

1. In a control for a motor driving a sump pump having associated lower and upper limit probes and intended for operation from the regular a-c. supply line, the combination comprising a transformer having its primary winding connected to the a-c. line and having a low voltage secondary winding with an associated rectifier to serve as a source of rectified half-waves of alternating current, first and second silicon controlled rectifiers having anode-cathode circuits connected in series with one another across said source and having control electrodes coupled to the respective lower and upper limit probes, the side of the transformer secondary winding which is associated with the anode terminals being grounded so that the controlled rectifiers are successively conditioned for conduction as the water rises to the level of the lower and upper limit probes, means including a capacitor connected in the anode-cathode circuit of the first controlled rectifier for applying direct voltage to the anode-cathode circuit of the second controlled rectifier for latching the same in the conductive state until such time as the water level drops below the level of the lower limit probe, a lamp connected in series with the anode-cathode circuit of the second controlled rectifier, a photocell close-coupled to the lamp so as to be responsive to the illumination thereof, a bilateral solid state switch having a load circuit connected in series with the motor and supply line and having a control electrode coupled to the photocell so that the motor remains turned on as long as current flows in the anode-cathode circuit of the second controlled rectifier.

2. In a control for a motor driving a sump pump having lower and upper limit probes, the combination comprising a transformer source of half-waves of a-c., a reference ground connection at the output side of the transformer, solid state switch having an anode-cathode circuit and a control electrode, a second solid state switch having an anode-cathode circuit and a control electrode, the anode-cathode circuits being connected in series with one another to the source of pulses, a capacitor connected in series with the anode-cathode circuit of the first switch and in parallel with the anode-cathode circuit of the second switch, the control electrode of the first switch being connected to the lower limit probe so that when the lower limit probe is submerged half-waves of current flow through the first switch to charge the capacitor, the second switch having a latching characteristic when energized by direct voltage and the control electrode of the second switch being connected to the upper limit probe so that when the upper limit probe is submerged by rising of the water level in the sump latched current flows through the second switch, and isolating relay means responsive to current flow through the second switch for turning on the motor with the latter being monitored on by reason of the latching until the water level drops below the lower limit probe.

3. In a control for a motor driving a sump pump having lower and upper limit probes, the combination comprising a transformer source of rectified half-waves of a-c., a reference ground connection at the output side of the transformer, first and second solid state switches having anode-cathode circuits connected to the source and the ground and having lower and upper control electrodes respectively connected to the probes, a capacitor connected in the anode-cathode circuit of the first switch so that the capacitor is charged whenever the first probe is submerged, means for applying direct voltage from the capacitor to the anode-cathode circuit of the second switch, the second switch having a latching characteristic when energized by direct voltage so that when the second probe is submerged by reason of a rise in the water level, latched current flows through the second switch, and relay means responsive to the current flow through the second switch but electrically isolated therefrom for energizing the motor until the capacitor is discharged by reasons of dropping of the water level below the lower limit probe.

4. In a control for a motor driving a sump pump having lower and upper limit probes, the combination comprising a transformer source of half-waves of a-c., a reference ground connection at the output side of the transformer, first and second silicon controlled rectifiers having their anode-cathode circuits connected to the source and having control electrodes respectively connected to the lower and upper probes, means including a capacitive element for operatively coupling the anode-cathode circuit of said first silicon controlled rectifier to the anode-cathode circuit of said second silicon controlled rectifier so that a rise in water level to the lower probe causes conduction in the first controlled rectifier for charging of the capacitor for application of direct voltage to the second controlled rectifier and a rise in water level to the upper probe causes flow of current in the second controlled rectifier which is latchingly maintained until the water level drops below the level of the lower probe, and solid state relay means responsive to flow of current in the second controlled rectifier but electrically isolated therefrom for energizing the motor.

5. In a control for a motor driving a sump pump having lower and upper limit probes, the combination comprising a transformer source of half-waves of a-c., a reference ground connection at the output side of the transformer, a solid state switch having an anode-cathode circuit connected to the source and having a control electrode connected to the upper probe, said switch having a latching characteristic when its anode-cathode circuit is energized by an uninterrupted forward biasing direct voltage, means including a capacitor coupled in series with the lower probe for applying an uninterrupted, forward biasing direct voltage component to the anode-cathode circuit of said switch as long as the lower probe is submerged so that when the control electrode is energized due to a rise in water level to the upper probe the switch is latched on and continues conduction until the water level drops below the lower probe despite the subsequent de-energization of the control electrode associated with said solid state switch, and solid state relay means responsive to the flow of current in the anode-cathode circuit but electrically isolated therefrom for energizing the motor.

6. In a control for a motor driving a sump pump having lower and upper limit probes, the combination comprising a transformer source of half-waves of a-c., a reference ground connection at the output side of the transformer, a solid state switch having an anode-cathode circuit connected to the source and having a control electrode connected to the upper limit probe, said switch having a latching characteristic when its anode-cathode circuit is energized by an uninterrupted, forward biasing direct voltage, a lamp connected in series with the anode-cathode circuit, a photocell coupled to the lamp, a bilateral solid state switch having a load circuit connected in series with the motor and having a control electrode coupled to the photocell for turning on the motor, and means including a capacitor coupled in series with the lower limit probe for applying an uninterrupted, forward biasing direct voltage to the anode-cathode circuit of said solid state switch to latch in the solid state switch for continued running of the motor, despite the subsequent de-energization of the control electrode associated with said solid state switch, until the water drops below the lower limit probe.

7. In a control for a motor driving a sump pump having associated lower and upper limit probes and arranged for powering from the regular a-c., power line, the combination comprising a transformer having its primary connected to the power line and having a low voltage secondary winding and an associated full-wave rectifier for providing a continuous train of rectified half-waves of a-c., a solid state switch having an anode-cathode circuit connected to the source of rectified half-waves and having a control electrode connected to the high limit probe, the switch having a latching characteristic when its anode-cathode circuit is energized by an uninterrupted, forward biasing direct voltage, a lamp connected in series with the anode-cathode circuit, a photocell closely coupled to the lamp but electrically isolated therefrom, a bilateral solid state switch having a load circuit connected in series with the motor and having a control electrode connected to the photocell so that when the water rises to the level of the upper limit probe conduction occurs in the solid state switch, means in series with and controlled by the lower limit probe for applying an uninterrupted, forward biasing direct voltage to the anode-cathode circuit of the solid state switch as long as the lower limit probe is submerged thereby to produce latching of the solid state switch and continued running of the motor, despite the subsequent de-energization of the control electrode associated with said solid state switch, until the water drops below the lower limit probe whereupon the motor is turned off, the lower limit probe being effectively connected to one terminal of the secondary winding and another terminal of the secondary winding being grounded so that alternating voltage is continuously applied to the lower limit probe thereby to minimize electrolytic plating or corrosion of the lower limit probe during sustained contact with the water in the sump.

* * * * *